United States Patent

Houben et al.

[11] Patent Number: 5,271,757
[45] Date of Patent: Dec. 21, 1993

[54] GLASSWARE TAKEOUT MECHANISM WITH PARALLEL LINKAGE

[75] Inventors: Heinz Houben, Zurich; Horst W. Müller, Diessenhofen, both of Switzerland

[73] Assignee: Emhart Glass Machinery Investments Inc., Wilmington, Del.

[21] Appl. No.: 973,256

[22] Filed: Nov. 9, 1992

[30] Foreign Application Priority Data

Nov. 14, 1991 [GB] United Kingdom ............... 9124211

[51] Int. Cl.⁵ .................................... C03B 9/44
[52] U.S. Cl. ........................... 65/239; 65/241; 65/260; 414/733; 414/917
[58] Field of Search ............... 65/260, 239, 241; 414/917, 733, 783, 416

[56] References Cited

FOREIGN PATENT DOCUMENTS 2134510 8/1984 United Kingdom ............... 65/260
2134511 8/1984 United Kingdom ............... 65/260

Primary Examiner—W. Gary Jones
Assistant Examiner—Steven P. Griffin
Attorney, Agent, or Firm—Spencer T. Smith

[57] ABSTRACT

A take out mechanism for a glassware forming machine comprises a parallel linkage for effecting movement of the takeout tongs. To enable adjustment of the position of the takeout tongs, the position of one of the fixed pivots of the parallel linkage may be adjusted.

4 Claims, 6 Drawing Sheets

5,271,757

GLASSWARE TAKEOUT MECHANISM WITH PARALLEL LINKAGE

The present invention is concerned with takeout mechanisms for use in glassware forming machines.

BACKGROUND TO THE INVENTION

In a common type of glassware forming machine, molten glass is formed into a parison in parison mould and the parison is then transferred to a blow mould in which it is blown into the shape of a formed container. After the glass has been blown into the desired shape, the blow mould is opened and the formed container, still hot and easily deformed and damaged, is removed from the blow mould by a takeout mechanism which deposits the container on a dead plate, on which it cools and from which it is removed to a conveyor.

Generally such a glassware forming machine forms more than one container in a cycle—commonly three or four. Consequently the machine will comprise a set of three or four blow moulds and the takeout mechanism will be arranged to pick up a set of containers from the blow moulds. Because the containers are easily damaged at this stage, it is highly desirable that the takeout mechanism, which comprises tongs which, in a pick up position engage the neck portions of the just formed containers, is accurately positioned with respect to the containers when the tongs engage the containers. Because of variations in the size of the moulds in which the containers are formed, it is desirable to be able readily to adjust the plane of the tongs, when they are in position to engage the necks, about the horizontal.

Further problems can be caused with existing takeout mechanisms, in that their construction is such that wear in gears or linkages of the mechanism may cause variation in the precise position of the tongs when in their pickup position.

BRIEF SUMMARY OF THE INVENTION

It is an object of the present invention to provide a takeout mechanism of robust construction which is readily adjustable to the plane of the blow moulds.

It is another object of the present invention to provide a takeout mechanism in which the adverse effect of wear of parts of the mechanism is minimized.

The present invention provides a takeout mechanism for use in a glassware forming machine comprising
 a frame member
 a parallel linkage mounted on the frame member and comprising
 a first link mounted in the frame for rotation about a first axis
 a second link parallel to the first link and mounted in the frame for rotation about a second axis.
 a pivot at an outer end of the first link
 a pivot at an outer end of the second link
 a supporting member mounted on said pivots in a substantially vertical position
 a takeout head carrying a plurality of take out tongs fixed to the supporting member
 a drive shaft arranged to rotate the first link about the first axis
 the position of the second axis being radially adjustable about the first axis There now follows a description, to be read with reference to the accompanying drawings, of two illustrative takeout mechanisms embodying the invention.

In the accompanying drawings
FIG. 1 shows a front view of the first illustrative takeout mechanism, with some parts broken away and a takeout head in a pickup position;
FIG. 2 shows a view corresponding to FIG. 1 with the takeout head in a top dead centre position;
FIG. 3 shows a side view, partly in section, of FIG. 2;
FIG. 4 shows a front view of the second illustrative takeout mechanism;
FIG. 5 shows a side view of the second illustrative mechanism;
FIG. 6 shows a front view of the second illustrative mechanism in a top dead centre position.

DETAILED DESCRIPTION

Figure 1:
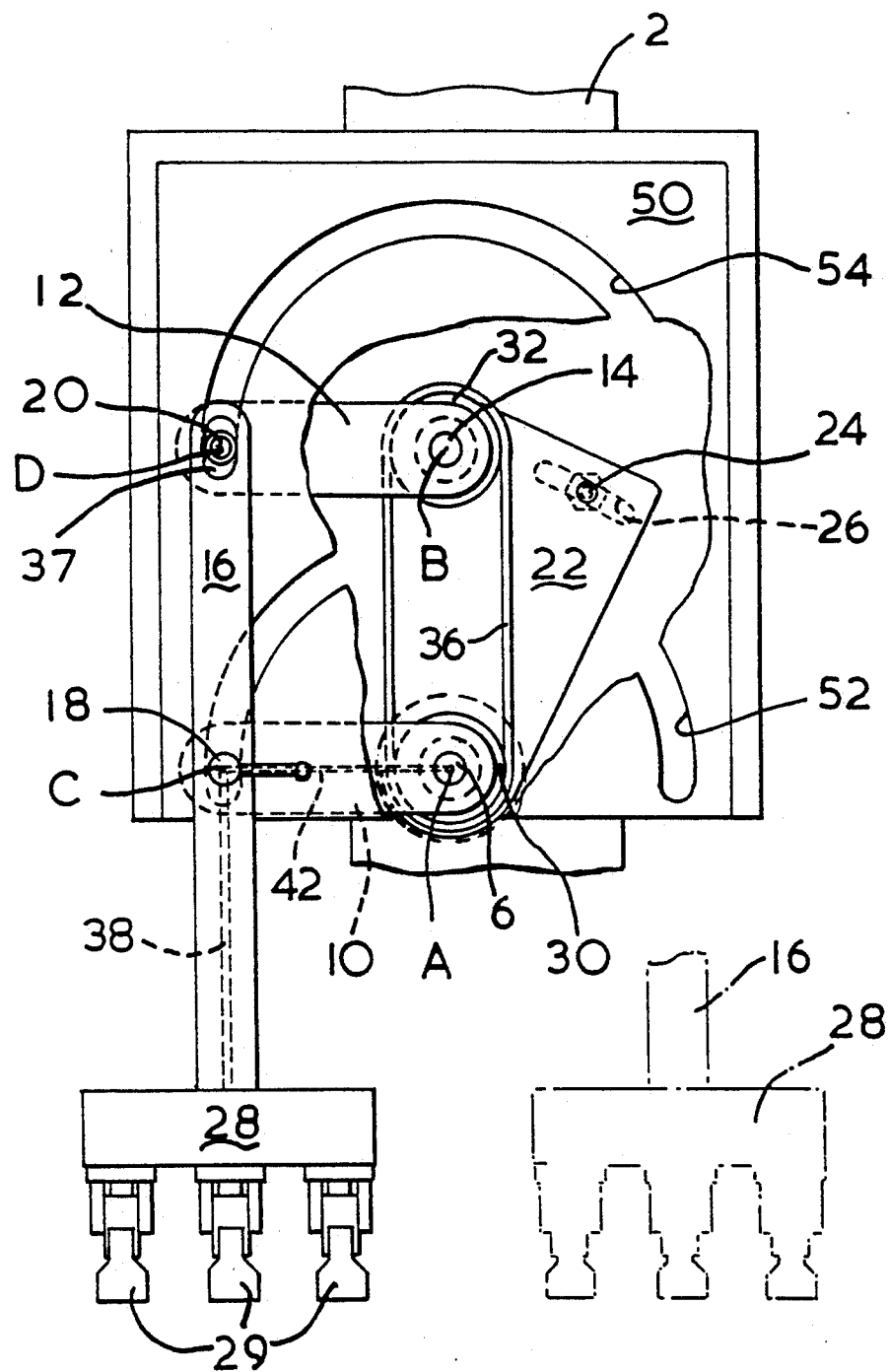

The first illustrative take out mechanism (FIGS. 1, 2 and 3) comprises a frame member 2, which is secured to the frame of a glassware forming machine. Mounted in a bearing 4 secured in the frame member 2 is a drive shaft 6 carrying a gear wheel 8 which, in the operation of the mechanism, is driven by a vertically reciprocating rack, not shown, as is conventional.

The drive shaft 6 is arranged to drive a parallel linkage which is mounted on the frame member and which comprises a first transverse link 10, fixed to the shaft 6, a second transverse link 12, parallel to the first link 10 and pivotally mounted on a pin 14, and a substantially vertical link 16, pivoted to the first link 10 at 18 and to the second link 12 at 20.

The distance between the axis A of the drive shaft 6 and the axis C of the pivot 18 is equal to that between the axis B of the pin 14 and the axis D of the pivot 20, and the distance between the axis A and the axis B is equal to that between the axis C and the axis D.

The pin 14 is mounted in an adjusting arm 22 which is pivotable about the axis A, a screw 24 in the arm 22 passing through a slot 26 in the frame member 2 which is arcuate about the axis A and adapted to secure the arm 22 in position. As a result, the arm 22 which supports pin 14 is pivotally displaceable about axis A so that pin 14, and hence axis B, can be adjusted by pivotally displacing the radius connecting axes A and B, about axis A.

Secured to a lower end portion of the link 16 is a tong head 28 of conventional construction comprising three tongs 29. The pivot 18 is provided by a quick change screw member having a handle 19 by which the pivot 18, and thus the link 16 and the tong head may readily be removed from the rest of the mechanism and replaced when necessary.

Compressed air to operate the tongs 29 is provided in a conventional manner through a passage 38 in the link 16, a passage 40 in the pivot 18, a passage 42 in the link 10 and a passage 44 in the shaft 6.

It will be understood that the greater the distance between the pivot points 18 and 20 (i.e. the greater the spacing of the links 10 and 12) the less effect any horizontal play in the pivots 18 and 20 will have on the precise positioning and orientation of the tongs 29, thus providing for accurate and consistent operation of the mechanisms.

A pulley 30 is secured to the shaft 6 and a similar pulley 32, of the same radius, is secured to a bush 34 fixed to the link 12 and rotatable about the pin 14. A belt 36 passes around both pulleys.

Figure 2:
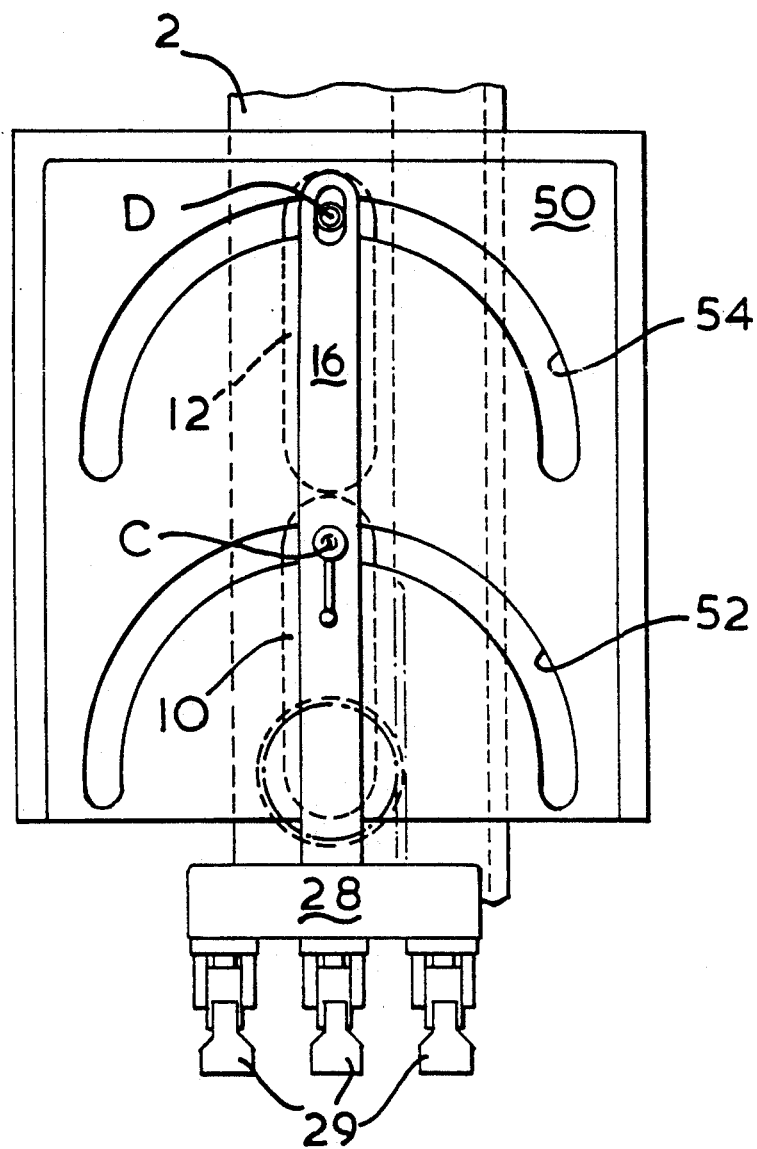
Figure 3:
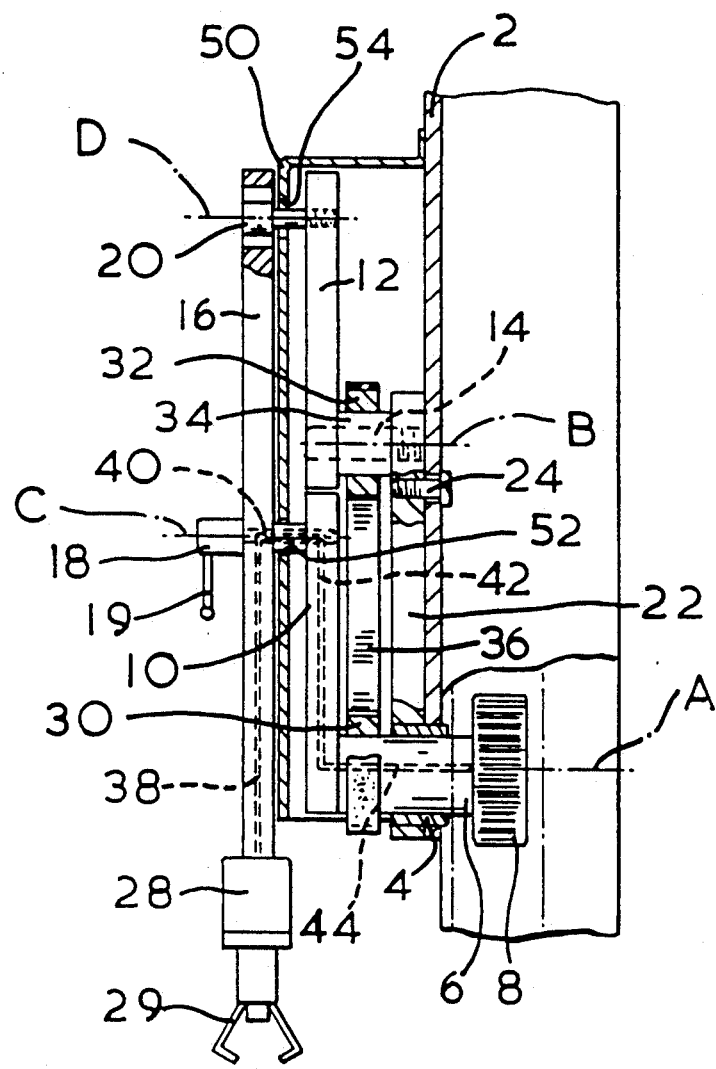

As can be seen from a consideration of FIGS. 1 and 2, on rotation of the shaft 6, the two transverse links 10 and 12 rotate about their axes A and B, and the link 16 carrying the tong head 28 is caused to move up and across, maintaining its vertical orientation, into the position shown in FIG. 2. Further rotation of the shaft 6 brings the tong head 28 down into a deposit position shown dotted in FIG. 1, thus carrying the tong head from a position (in full line in FIG. 1) in which it is able to pick up containers from a series of moulds in which they are formed into its deposit position in which the containers can be deposited on a dead plate.

With a parallel linkage as described there is a possibility that, at the top dead centre position shown in FIG. 2, further clockwise rotation of the link 10 might be accompanied by anticlockwise rotation of the link 12, thus leading to jamming of the linkage. The presence of the belt 36 running around the pulleys 30 and 32 prevents the possibility of such jamming as it ensures that both links 10 and 12 rotate in the same direction.

The illustrative mechanism allows for easy adjustment of the angle of the tong head at the position at which it picks up formed containers from the moulds. It is obviously desirable that the plane of the tongs in this position corresponds to the plane of the tops of the containers so that all containers are picked up identically by the tongs. It can be seen that by adjustment of the angular position of the arm 22, the inclination to the vertical of the link 16 may be varied, thus to adjust the plane in which the tongs of the tong head 28 lie.

The pivot 20 between the link 12 and the link 16 is positioned in a vertical slot 37 in the link 16. This allows for slight movement of the pivot relative to the link 16 (which is however maintained in its upright orientation) and assists in avoiding any tendency of the linkage to jam when moving through the top centre position.

A cover plate 50 secured to the frame member 2 comprises arcuate slots 52, 54 through which the pivots 18 and 20 pass and move.

The second illustrative take out mechanism (FIGS. 4, 5 and 6) resembles the first illustrative mechanism in many respects.

A frame member 102 is secured to the frame of a glassware forming machine. Mounted in a bearing 104 secured to the frame member 102 is a drive shaft 106 which carries a gear wheel 107 which in the operation of the mechanism is driven by a rack 108 which reciprocates vertically.

The drive shaft 106 is arranged to drive a parallel linkage which is mounted on the frame member 102 and which comprises a first transverse link 110, fixed to the shaft 106, a second transverse link 112, parallel to the link 110 and pivotally mounted on a pin 114, and a substantially vertical link 116, pivoted to the first link 110 at 118 and to the second link 112 at 120.

The distance between the axis X of the drive shaft 106 and the axis Y of the pin 114 is equal to that between the axis Z of the pivot 118 and the axis W of the pivot 120 and the distance between the axis X and the axis Z is equal to that between the axis Y and the axis W.

The pivot 114 is mounted in an adjusting arm 122 which is pivotal about the axis X, a screw 123 being secured in a ball fixing 125 secured to frame member engaging threadedly with a bush 127 fixed in the arm 122 so that by adjustment of the screw 123 the radial position of the arm 122 about the axis X may be adjusted. A screw 124 in the frame member 102 passes through a slot 126 which is arcuate about the axis X and can be used to secure the arm 122 in position.

Mounted on a lower end portion of the link 116 is a tong head 128 of conventional construction comprising three tongs 129.

The pivot 118 is provided by a quick change screw member having a handle 119 by which the pivot 118 and thus the tong head 128 may readily be removed from the mechanism and replaced when necessary.

Compressed air to operate the tongs 129 is provided in a conventional manner through a passage 138 in the tong head 128, a passage 140 in the pin 118, a passage 142 in the link 110 and a passage 144 in the shaft 106.

It will be realized that because of the distance between the pin 118 and the pivot 120, play in the pivot 120 will have comparatively little effect on the arcuate positioning of the tongs 129 of the tong head 128.

An arcuate link 130 extending generally vertically, has one end portion pivoted at 132 on a lug 134 secured to the link 110 and the other end portion pivoted at 136 on a downward extension 137 of the link 112. The spacing of the axes of the pivots 132 and 136 is equal to the spacing between the axes X and Y.

Figure 4:
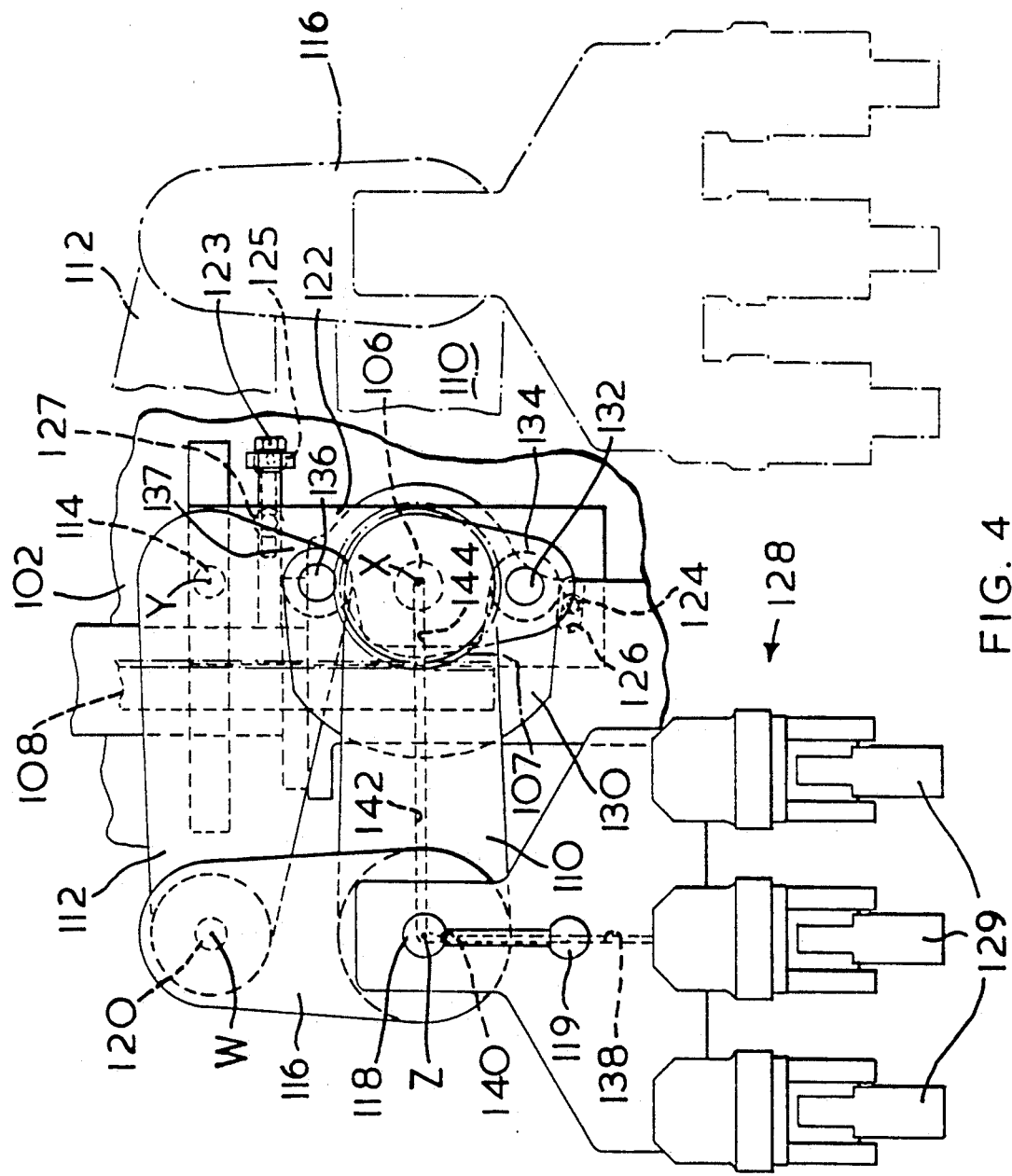
Figure 5:
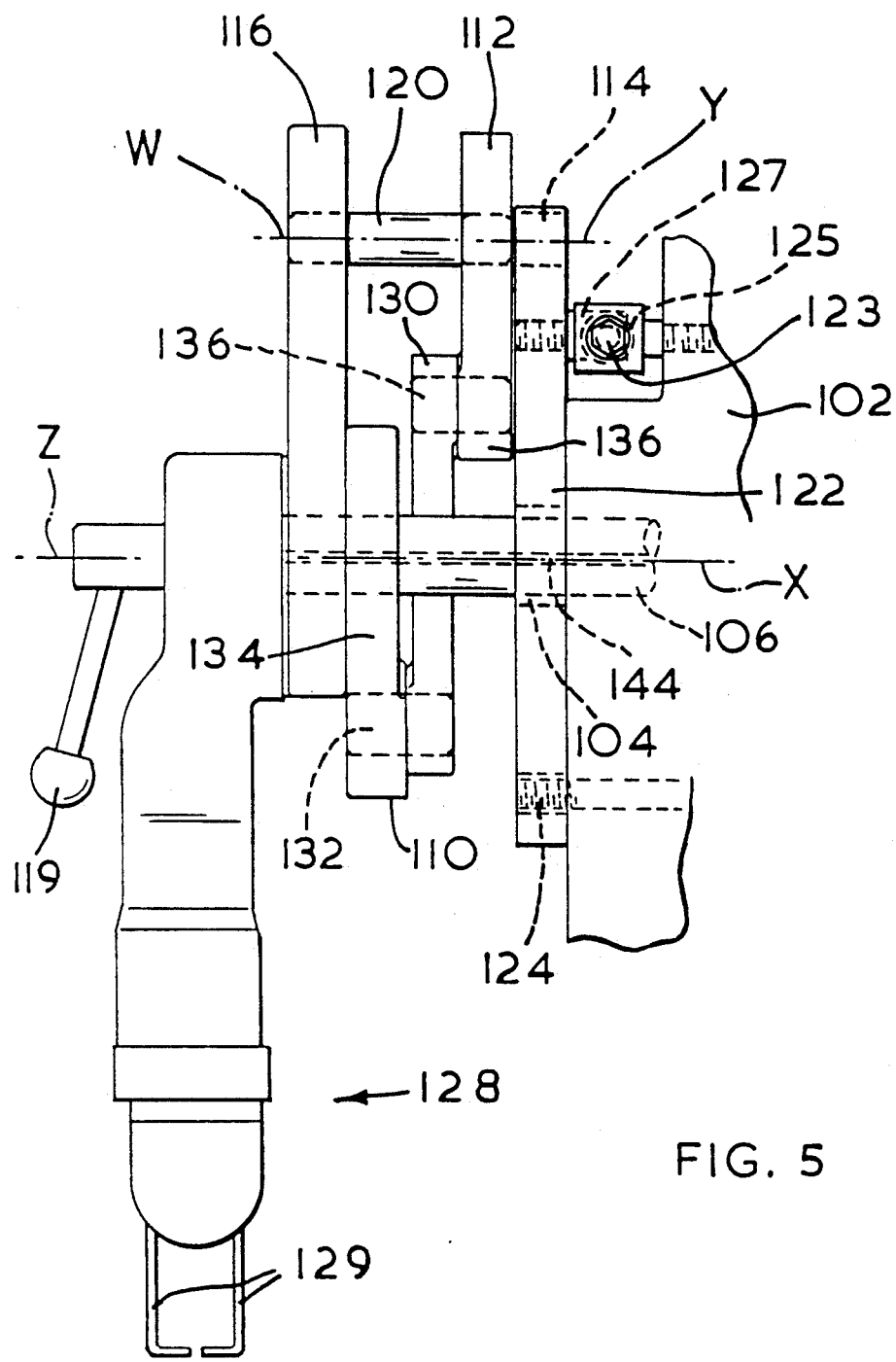
Figure 6:
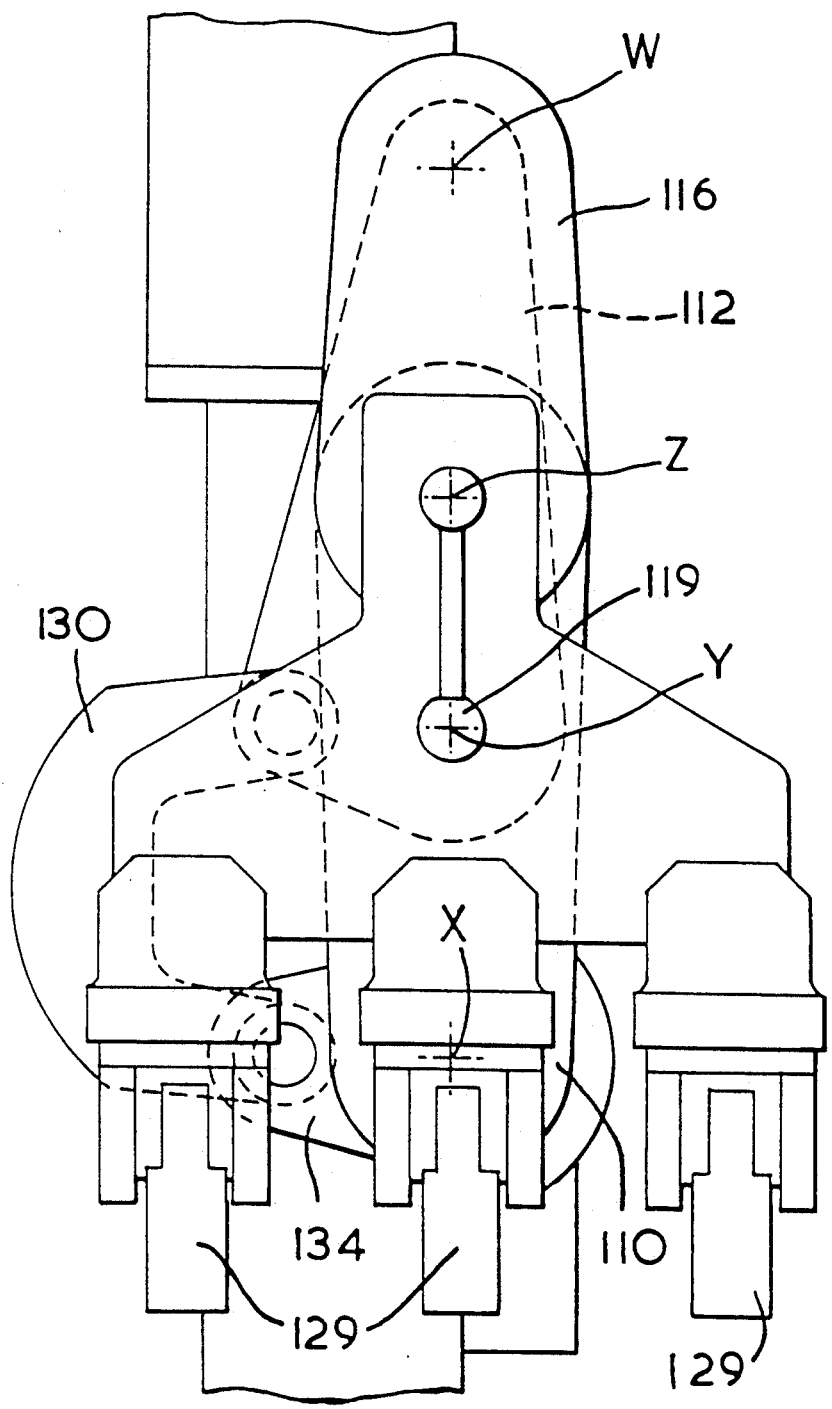

As can be seen from a consideration of FIGS. 4 and 6, on rotation of the shaft 106, the two transverse links 110 and 112 rotate about their axes X and Y, and the link 116 carrying the tong head 128 is caused to move up and across, maintaining its vertical orientation, into a top dead centre position shown in FIG. 6. Further rotation of the shaft 106 brings the tong head 128 down into a deposit position (shown dotted in FIG. 4) thus carrying the tong head 128 from a position in which it is able to pick up containers from a series of moulds in which they are formed into its deposit position in which the containers are deposited on a dead plate.

As discussed in relation to the first embodiment, with a parallel linkage there is, particularly if there is some wear in the pivots of the linkage, a possibility that at a top dead centre position as shown in FIG. 6, further clockwise rotation of the link 110 might be accompanied by anticlockwise rotation of the link 112, thus leading to jamming of the linkage. The arcuate link 130 operates to ensure that on such clockwise rotation of the link 110, only clockwise rotation of the link 112 can result, thus preventing the possibility of such jamming.

Again the second illustrative mechanism allows for easy adjustment of the angle of the tong head 128 at the position at which it picks up formed containers from the moulds. By adjustment of the angular position of the adjusting arm 122, the inclination to the vertical of the link 116 and thus of the tong head 128 may be varied, thus to adjust the plane in which the tongs 129 lie.

We claim:

1. A takeout mechanism for use in a glassware forming machine comprising
    a frame member,
    a first elongated link,
    first means for mounting one end of said first link on said frame for pivotal displacement about a first axis,
    a second elongated link extending parallel to said first link,
    second means for mounting one of said second link for pivotal displacement about a second parallel axis,
    means for supporting said second means for mounting for pivotal displacement about said first axis through a selected angle, means for preventing the pivotal displacement of said supporting means at any location within said selected angle, a third link pivotally connected to the other end of said first and second links to establish a parallel linkage, a takeout head fixed to said third link and carrying at least one takeout tong.

2. A takeout mechanism according to claim 1 wherein said supporting means comprises an arm including a slot defined therein extending circumferentially about said first axis.

3. A takeout mechanism according to claim 1 wherein said third link extends vertically.

4. A takeout mechanism according to claim 1 wherein said first and second mounting means each include a pulley and further comprising a belt extending around said pulleys.

* * * * *